United States Patent
Dominiak et al.

(10) Patent No.: US 10,821,404 B2
(45) Date of Patent: Nov. 3, 2020

(54) CONTROL METHOD FOR A FILTER SYSTEM

(71) Applicant: GRUNDFOS HOLDING A/S, Bjerringbro (DK)

(72) Inventors: Dominik Dominiak, Lodz (PL); Jacob Appelt Vibe Svendsen, Silkeborg (DK); Christian Rasmussen, Tjele (DK); Rune Hoejsholt, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 109 days.

(21) Appl. No.: 15/503,843

(22) PCT Filed: Aug. 11, 2015

(86) PCT No.: PCT/EP2015/068494
§ 371 (c)(1),
(2) Date: Feb. 14, 2017

(87) PCT Pub. No.: WO2016/023917
PCT Pub. Date: Feb. 18, 2016

(65) Prior Publication Data
US 2017/0232396 A1  Aug. 17, 2017

(30) Foreign Application Priority Data
Aug. 15, 2014 (EP) .................................... 14181141

(51) Int. Cl.
*B01D 65/02* (2006.01)
*C02F 1/00* (2006.01)
(Continued)

(52) U.S. Cl.
CPC ............. *B01D 65/02* (2013.01); *B01D 61/22* (2013.01); *B01D 61/32* (2013.01); *C02F 1/008* (2013.01);
(Continued)

(58) Field of Classification Search
CPC .... B01D 65/02; B01D 2321/04; B01D 65/08; B01D 61/22; B01D 61/12; B01D 2315/20
See application file for complete search history.

(56) References Cited

U.S. PATENT DOCUMENTS 5,693,229 A * 12/1997 Hartmann ............... A23L 2/087
210/650
6,009,404 A * 12/1999 Eimer .................. B01D 29/117
705/7.12
(Continued)

FOREIGN PATENT DOCUMENTS

JP    2013 052326 A    3/2013
WO   2013/163146 A1   10/2013

*Primary Examiner* — Ana M Fortuna
(74) *Attorney, Agent, or Firm* — McGlew and Tuttle, P.C.

(57) ABSTRACT

A control method is provided for a filter system, which includes at least one filter element (2). The method includes continuously recording a total energy consumption ($E_G$) during a filtration cycle (22) of the filter system. The total energy consumption ($E_G$) includes at least of the energy consumption ($E_B$) for a physical cleaning (24) and the energy consumption ($E_P$) for the subsequent production cycle (23) up to a predefined, in particular current point in time. The method further includes computing a relative energy consumption ($E_{rel}$) by way of division of the recorded total energy consumption ($E_G$) by a net permeate volume ($Q_N$) which has been produced during the filtration cycle (22) up to the predefined point in time and starting a physical cleaning (24) in dependence on the relative energy consumption or of a characteristic value derived from this.

21 Claims, 12 Drawing Sheets

(51) Int. Cl.
   *B01D 61/22*   (2006.01)
   *B01D 61/32*   (2006.01)
(52) U.S. Cl.
   CPC ...... *B01D 2311/20* (2013.01); *B01D 2313/48* (2013.01); *B01D 2321/04* (2013.01); *B01D 2321/185* (2013.01); *B01D 2321/30* (2013.01); *B01D 2321/40* (2013.01); *C02F 2209/00* (2013.01); *C02F 2303/16* (2013.01)

(56) References Cited

U.S. PATENT DOCUMENTS

| | | | | |
|---|---|---|---|---|
| 2009/0152197 | A1* | 6/2009 | Lilas | B01D 61/025 |
| | | | | 210/636 |
| 2011/0056522 | A1* | 3/2011 | Zauner | B01D 65/02 |
| | | | | 134/27 |
| 2013/0075331 | A1* | 3/2013 | Peiris | B01D 61/12 |
| | | | | 210/636 |
| 2014/0076807 | A1* | 3/2014 | Chidambaran | B01D 61/58 |
| | | | | 210/636 |
| 2015/0306544 | A1* | 10/2015 | Park | B01D 65/02 |
| | | | | 210/636 |
| 2016/0046503 | A1* | 2/2016 | Hoek | B01D 61/12 |
| | | | | 210/636 |
| 2017/0232396 | A1* | 8/2017 | Dominiak | B01D 61/22 |
| | | | | 210/636 |

* cited by examiner

CONTROL METHOD FOR A FILTER SYSTEM

CROSS REFERENCE TO RELATED APPLICATIONS

This application is a United States National Phase Application of International Application PCT/EP2015/068494 filed Aug. 11, 2015, and claims the benefit of priority under 35 U.S.C. § 119 of European Application 14 181 141.4 filed Aug. 15, 2014, the entire contents of which are incorporated herein by reference.

FIELD OF THE INVENTION

The invention relates to a control method for a filter system which comprises at least one filter element.

BACKGROUND OF THE INVENTION

Filter systems are known, for example, in order to filter water from wells for the processing of drinking water. Such filter systems comprise one or more filter elements, in particular membranes. These become dirty in the course of the filtration and must be cleaned at regular intervals by way of backwashing and, as the case may be, cleaning-in-place. Thereby, it is known to initiate such backwashing or physically cleaning and cleaning-in-place processes in dependence on the changing differential pressure across the filter.

The cleaning and backwashing procedures as a rule require additional energy, consume previously filtrated water and lead to stoppages of the installation.

SUMMARY OF THE INVENTION

With regard to this problem, it is an object of the invention, to provide a control method for a filter system, by way of which the production or filtration cycles and cleaning cycles are optimized in a manner such that an as cost-effective as possible production or filtration is possible with the filter system. This object is achieved by a control method with the features specified in claim 1 and preferably by a control method with the features specified in claim 7. Further preferred embodiments are to be deduced from the associated dependent claims, the subsequent description as well as the attached figures.

The control method according to the invention is envisaged for a filter system which for example comprises a filter element, in particular a membrane. Thereby, it can be the case of a filter element which is designed as a crossflow filter or a dead-end-filtration system. Such a filtration system as the case may be, comprises one or more pumps, by way of which the medium to be delivered is delivered to and through the filter element. Moreover, valves and further pumps can be provided for carrying out physical cleaning procedures, such as backwashing and cleaning-in-place processes. Further mechanical cleaning means and, as the case may be, air feed systems can also be present.

The object of the control method according to the invention is to optimize the points in time, at which cleaning processes are started and finished, in a manner such that the complete operation of the filter system is cost-optimized, i.e. that the costs per produced permeate quantity are minimized.

For this, according to the invention, one envisages continuously detecting and recording the total energy consumption of the filter system. The energy consumption in particular results from the energy consumption of present pumps, which deliver the medium to be delivered through the filter system. This energy consumption is continuously recorded, in particular summed, during the filtration cycle, so that the total energy consumption for a filtration cycle can be determined. The total energy consumption thereby is composed at least of the energy consumption for a physical cleaning of the filter system, for example a backwashing or backwashing cycle and the energy consumption for the subsequent production cycle, in which permeate is produced, up to a predefined, in particular the current point in time. The complete filtration cycle, for which the total energy consumption is determined, is thus composed at least of a backwashing procedure and a subsequent production cycle, i.e. the cycle, in which one filtrates. Thereby, the total energy consumption in this filtration cycle is preferably summed, up to the predefined point in time.

According to the invention, one further envisages a relative energy consumption being computed or determined. Thereby, the computation of this relative energy consumption is likewise preferably effected in a continuous manner, so that the relative energy consumption at the current point in time is determined. The computation of the relative energy consumption is also effected by way of the division of the recorded or summed total energy consumption by a net permeate volume, which has been produced during the filtration cycle, i.e. the production cycle up to a predefined point in time. I.e. the relative energy consumption determines the energy consumption per produced net permeate volume at a certain point in time. Since energy is firstly consumed at the beginning of the filtration cycle in a physical cleaning, without producing permeate, the relative energy consumption per produced net permeate volume will firstly be relatively high in the subsequent production cycle, and then will fall with the increasingly produced permeate quantity. The net permeate volume is thereby the permeate volume which was produced net, which means to say the produced permeate volume minus that permeate volume which for example is required for a physical cleaning such as a backwashing. This means that initially the net permeate volume will be negative as the case may be.

According to the invention, one envisages displacing the point in time, at which a physical cleaning, for example a backwashing is started, to a point in time at which the minimal energy consumption is given. This means beginning a physical cleaning in dependence on the thus determined relative energy consumption or on a characteristic value which is derived from this, preferably beginning it at a point in time, at which this has reached a predefined value or exceeded it. Ideally, this is a point in time, at which the relative energy consumption has reached a minimum. In practice, the exact reaching of the minimum possibly cannot be detected, but one however can ascertain when the minimum has been passed through, which is to say the relative energy consumption increases again. This means that the physical cleaning is preferably carried out when the reaching or passing of the minimum for the relative energy consumption is detected. This is the point in time, at which essentially minimal production costs are achieved. As described, the relative energy consumption will firstly decrease with an increasingly produced permeate volume, after the physical cleaning. However, it will later increase again, since the permeate volume produced per unit of time reduces with an increased contamination of the filter element and, as the case may be, simultaneously the energy consumption increases on account of the higher flow resistance. I.e. the optimal point in time for the beginning of a physical cleaning procedure can be determined due to the consideration of the relative energy which is according to the invention.

Either the relative energy consumption can be considered in a direct manner, or a characteristic value derived from this, in particular the derivative of the relative energy consumption with respect to time or its magnitude, in order to determine the point in time for terminating the production cycle.

According to the invention, the cleaning procedure is thus no longer made dependent on the pressure or flow conditions in the filter system, but on the energy consumption or on the production costs which likewise represent a characteristic value or variable derived from the energy consumption. For this, an analysis of the total energy consumption and of the relative energy consumption per net permeate volume is carried out preferably in a continuous manner.

Yet further costs other than only energy costs, for example for consumed material etc. can be included in the production costs. The production costs in the context of this application are to be seen as equivalent in the context of "energy consumption". The production costs in particular can also include the costs of chemicals. Such costs can be converted into an equivalent energy consumption and then be taken into account in the computation as with the energy consumption.

Preferably, the physical cleaning is begun when the temporal derivative or its magnitude, of the continuously determined relative energy consumption has reached a predefined gradient, in particular corresponds to zero. I.e. with this consideration, the relative energy consumption is plotted over time and the gradient of the resulting curve is considered. As explained above, in the production cycle, the relative energy consumption after a physical cleaning firstly reduces until it has reached a minimum and it increases again thereafter. Ideally, the minimal gradient or the minimum of the magnitude of the gradient of this curve is determined and forms the predefined gradient, at which the physical cleaning is begun. However, it is also possible to use gradients different to zero as a predefined gradient, in particular points on the mentioned curve, which with regard to time lie before or after the minimum. Although a certain shortening of the intervals between two physical cleanings increases the number of physical cleanings to be carried out, however on the other hand it permits the increase of the interval between two necessary cleaning-in-place procedures which would be necessary after a certain number of physical cleaning cycles with production cycles lying therebetween. With the cleaning-in-place (CIP) procedures, it is the case of on-location cleaning amid the use of suitable cleaning media.

The mentioned considered net permeate volume preferably corresponds to the produced permeate volume minus that volume which is used for a physical cleaning and/or a cleaning-in-place. A part of the produced permeate is necessary for a physical cleaning, such as a backwashing, and this part is thus no longer available for use. Thereby, it is always a filtration cycle consisting of a physical cleaning with a subsequent production cycle which is considered, and in the production cycle the absolute, produced permeate volume summed and the permeate volume used with the preceding cleaning subtracted from this, so that ideally at every point in time, the net permeate volume produced up to this point in time can be determined and used as a basis for above-mentioned evaluation of the starting point for the next necessary physical cleaning. The additional or alternative consideration of the permeate volume which is required for a cleaning-in-place particularly lends itself if the point in time of the cleaning-in-place is also to be determined on the basis of the relative energy consumption. The energy consumption and the net permeate volume would then be considered or recorded over several filtration cycles each consisting of a physical cleaning and a subsequent production cycle, so that preferably a recording from one cleaning-in-place to the next cleaning-in-place is always effected.

According to a further preferred variant, the net permeate volume also as a target volume forms the basis for the permeate volume to be produced by the filter system. I.e. according to the control method according to the invention, one preferably ensures that the filter system produces a net permeate volume per unit of time which corresponds to a target value. If the net permeate volume exceeds this target value, then the production quantity is reduced for example by way of reducing the flow rate of a delivery pump, by which means the energy consumption can be reduced. Conversely, the production quantity can be increased if the net permeate volume falls short of the target value. The production quantity thereby is the permeate volume which is currently produced per time unit, and which is thus preferably adapted such that a desired net permeate volume is always produced.

Preferably, the recording of the total energy consumption and of the net permeate volume is started anew or restarted, before carrying out a physical cleaning or implementing a cleaning-in-place. This means that it is always ideally only the current filtration cycle consisting of the physical cleaning and the subsequent production cycle until the next physical cleaning which is considered for determining the net permeate volume. Thereby the energy consumption for the cleaning procedure as well as the summed energy consumption in the subsequent production cycle is included in the total energy consumption. Accordingly, the net permeate volume is the permeate volume produced in the current production cycle minus that permeate volume which was consumed in the preceding physical cleaning procedure. This means that the net permeate volume at the beginning of a production cycle directly after a physical cleaning can firstly be negative until the quantity of permeate which was consumed in the physical cleaning, is produced again. In the case that a global consideration of the relative energy consumption is used for determining the point in time for a cleaning-in-place, as is described hereinafter, it lends itself to start the recording of the total energy consumption and of the net permeate volume afresh before carrying out the cleaning-in-place. However, it is simultaneously also additionally possible to separately detect the total energy consumption and the net permeate volume for each filtration cycle in the previously mentioned manner, in order to set the beginning of the physical cleaning in the described manner.

The physical cleaning for example can be a backwashing and/or a crossflow and/or a mechanical scraping and/or an air scouring. Other cleaning methods, which are necessary after certain production duration for cleaning the filter element or elements, can also be applied. The physical cleaning thereby preferably represents a purely physical cleaning without the addition of chemical cleaning media, as are usually applied with the cleaning-in-place.

According to a particular embodiment of the invention, at least one system parameter is continuously monitored during the physical cleaning between two production cycles, and the physical cleaning is carried out for so long until this system parameter remains essentially stable. This means that the physical cleaning is not carried out for a predefined time duration, but the cleaning result is ascertained by way of monitoring the system parameter. Thereby, one does not gear to a predefined cleaning result which could be represented for example by a predefined transmembrane pressure across the membrane or the filter element, but according to the invention the physical cleaning is finished when the cleaning result cannot be improved any further. This point in time is represented by way of the fact that the monitored system parameter remains stable at this point in time and does not change any further. I.e. the system parameter does not need to reach a predefined limit value, but a change of the system parameter is monitored and the physical cleaning is finished when the system parameter no longer or essentially no longer changes. The physical cleaning can be cost-optimized in this manner, since it is carried out only for so long until a cleaning effect can be achieved. This control method which controls the duration of the physical cleaning by way of a system parameter being continuously monitored and the physical cleaning being finished when this system parameter becomes stable, can also be realized independently of the previously described control method, by way of which the starting point in time for the physical cleaning is determined. Inasmuch as this is concerned, this method for determining the duration of the physical cleaning, on its own also solves the above-mentioned object of being able to realize a cost-improved operation of a filter system.

The monitored system parameter is preferably seen as being stable if a currently measured value of the system parameter differs from a continuously determined average of this system parameter by less than a predefined amount, i.e. the system parameter is preferably continuously recorded and an average is formed from this recording in a continuous manner or in predefined intervals. The currently detected value is then compared to the last formed average value. If the difference is less than a predefined difference or a predefined limit value, then the system parameter is seen as being stable.

With regard to the mentioned system parameter, which is monitored or observed during the physical cleaning, it is preferably the case of a hydraulic resistance of the filter system or a characteristic value representing this. According to the invention, thereby a specific relationship between the pressure and flow rate in the filter system or across the filter element is thereby preferably considered as a hydraulic resistance. Thereby, preferably not only is the pressure drop across the filter element or membrane itself, but also the hydraulic resistance in the rest of the filter system also taken into account. Thereby, for example the following relationship between the pressure and the flow rate can form the basis:

$$P = C_1 \cdot Q^2 + C_2 \cdot Q + C_3$$

wherein P is the pressure drop across the complete filter system, Q the flow rate and $C_1$, $C_2$, $C_3$ represent constants.

The second term in the equation thereby represents the pressure drop across the membrane (Darcy equation), whereas the first term represents the pressure drop or the hydraulic resistance in the remaining part of the filter system.

Further preferably, the pressure across the filter element, i.e. the differential pressure between the entry and exit of the filter element, and the flow rate through the filter element is detected during the physical cleaning, for detecting the at least one system parameter and in particular the hydraulic resistance.

Further preferably, the pressure difference between the entry and exit of the complete filter system is considered for detecting the pressure drop in the complete system. Suitable pressure sensors and flow sensors are provided for this. The flow rate as the case may be can also be derived from the operating parameters of a delivery pump, which delivers the medium to be delivered, through the filter element.

According to a further preferred variant of the control method, a cleaning-in-place or a cleaning-in-place procedure is started when the pressure across the filter element or across the filter system reaches a predefined maximum. If the pressure, i.e. the differential pressure between the entry side and the exit side of the filter system or in particular of the filter element reaches a certain maximum, this is an indication that the filter element is clogged or contaminated to a certain degree, so that the required throughflow or flow rate is no longer given. This is the point in time at which a cleaning-in-place then takes place, as the case may be amid the addition of suitable chemicals. After the cleaning-in-place, again the filtration cycles described above and in each consisting of a physical cleaning and a subsequent production cycle or production step are carried out, until a next cleaning-in-place is necessary. A cleaning-in-place with the subsequent filtration cycles up to the beginning of the next cleaning-in-place is subsequently indicated as a cleaning-in-place cycle. I.e. a cleaning-in-place cycle includes a cleaning-in-place and several filtration cycles, wherein the filtration cycles in each case consist of its physical cleaning and a subsequent production step or production cycle.

Further preferably, the point in time for the next cleaning-in-place is determined by way of extrapolation of a curve which defines the pressure across the filter system or the filter element at the end of the filtration cycle against the number of filtration cycles. I.e., the pressure or the pressure difference across the filter system or filter element at the end of a filtration cycle, i.e. before the beginning of the next mechanical cleaning step is detected, and this pressure is plotted against the number of effected filtration cycles. Thereby, the pressure or the pressure difference, for example across a filter membrane will increase from filtration cycle to filtration cycle, since the filter element cannot be completely regenerated or cleaned by way of the mechanical cleaning in every filtration cycle. Via an extrapolation of this curve, one can determine when the curve will reach the predefined maximum for the pressure or the pressure difference, which requires a next cleaning-in-place. Thus the point in time for this or the number of filtration cycles until the cleaning-in-place can be predetermined or predicted.

Further preferably, the predefined gradient or the limit gradient for the relative energy consumption, at which a physical cleaning is began, is adapted in dependence of an estimated energy consumption which is determined on the basis of the energy consumption of a number of preceding filtration cycles. I.e. the energy consumption for subsequent filtration cycles is computed or extrapolated on the basis of energy consumptions of several preceding filtration cycles. The predefined gradient, at which a physical cleaning is started, is adapted on the basis of this estimated, expected energy consumption. An extrapolation of the energy consumption of a number of filtration cycles can be computed for this, in particular for adapting the predefined gradient, in order to predict the energy consumption of a current cleaning-in-place cycle. The current cleaning-in-place cycle includes a cleaning-in-place procedure and a number of filtration cycles which are subsequent thereto until the beginning of the next cleaning-in-place or cleaning-in-place procedure. The energy consumption of the number of past filtration cycles forms the basis and from this the energy consumption for the following filtration cycles is predicted by way of extrapolation, in order to predict the energy consumption of the current cleaning-in-place cycle. Thus the energy consumption for the complete current cleaning-in-place cycle can be predicted or estimated with the knowledge of the number of filtration cycles until the next cleaning-in-place, which is determined for example by way of extrapolation of the curve which displays pressure against a the number of filtration cycles, as is described above. The thus predicted energy consumption is compared with a previously predicted energy consumption for the current cleaning-in-place cycle. I.e. a prediction of the energy consumption for the current or running cleaning-in-place cycle is continuously effected and by way of comparison one observes how this predicted energy consumption changes for example from filtration cycle to filtration cycle.

The predefined gradient is preferably increased if the previously, i.e. previously predicted energy consumption is lower than the currently predicted energy consumption for the current or running cleaning-in-place cycle. I.e. the filtration cycles are shortened by way of increasing the predefined gradient, when the thus estimated energy consumption or the estimated costs for the running cleaning-in-place cycle increase, so that a physical cleaning takes place in shorter intervals.

Conversely, it is preferable for the predefined gradient to be reduced when the previously predicted energy consumption is greater than the currently predicted energy consumption. In this case, the predicted energy consumption for the complete running cleaning-in-place cycle reduces from filtration cycle to filtration cycle, so that the filtration cycles are extended by way of reduction of the predefined gradient, i.e. the intervals between the individual physical cleanings are increased. With this, the energy consumption for the complete cleaning-in-place cycle can be minimized by way of this adaptation of the predefined gradient. Thereby, on estimating the energy consumption for the current cleaning-in-place cycle, preferably not only the energy consumption for the filtration cycles, but also the energy consumption for a cleaning-in-place or a cleaning-in-place procedure is also taken into account. Instead of only taking the energy consumption into consideration, one could also take the costs into account instead of the energy consumption and the current costs can be summed and predicted for the cleaning-in-place cycle. Apart from the energy consumption, for example the costs for the cleaning media which are required with the cleaning-in-place can also be included in the costs.

The point in time of a cleaning-in-place can also be determined in an alternative manner to the previously described method. Thus for example a total energy consumption can be continuously recorded, and this corresponds at least to the energy consumption for a cleaning-in-place, to the energy consumption for the effected physical cleanings after the last cleaning-in-place and to the energy consumption for the production cycles which have been effected since the last cleaning-in-place, up to a predefined, in particular current point in time. Accordingly, the relative energy consumption can then be continuously determined on the basis of this total energy consumption. Thereby, a net permeate volume forms the basis, which as explained above, corresponds to the produced permeate volume minus the permeate volume which is required for the last cleaning-in-place as well as for the physical cleanings effected since this. A cleaning-in-place can then be started on the basis of a thus detected and continuously recorded global, relative energy consumption, when this relative energy consumption has reached or passed a minimum. This means that the evaluation of the point in time for a cleaning-in-place is effected in the corresponding manner as was described above for the evaluation of the point in time of a physical cleaning by way of a local relative energy consumption only covering one production cycle. The point in time at which the relative energy consumption has essentially reached its minimum is also selected for the beginning of a cleaning-in-place. As the case may be, this point in time can only be recognized after a running-through or an exceeding of the minimum, so that the minimal energy consumption cannot be determined in very exact manner. Thus the global relative energy consumption over several production cycles or several physical cleanings is recorded, which is to say considered, for determining the point in time of a cleaning-in-place.

With this consideration, the determining of the point in time for a physical cleaning is then preferably effected in a manner such that relative energy consumption, which is to say the global relative energy consumption is continuously computed and plotted as a curve over time, wherein a physical cleaning is preferably started when the magnitude of the gradient of this curve has reached or passed its maximum. The gradient of the curve is negative which means the relative energy consumption reduces with time since it reduces with an increasingly produced permeate volume. However, the reduction of the relative energy consumption slows down with an increasing contamination of the filter element, since the quantity of the permeate volume currently produced under constant pressure conditions reduces with this. A physical cleaning, for example a back-flushing is preferably started if the gradient of this curve reduces or the magnitude of the gradient of this curve reduces, which is to say has exceeded its maximum. Thus the point in time for a cleaning-in-place as well as the point in time for a physical cleaning lying therebetween or several physical cleanings lying therebetween can be determined from the curve for the global relative energy consumption.

According to a further preferred embodiment, the control method according to the invention is applied for the control of a filter system, in which a crossflow prevails in the filter system, i.e. a crossflow flow flows over the filter element, in particular a membrane, at the entry side of this element or membrane. This crossflow according to the control method according to the invention is preferably set on the basis of the current permeate flow, i.e. the volume flow of the crossflow is adapted to the current volume flow of the permeate flow. Preferably thereby, the crossflow is increased when the permeate flow through the filter element is smaller than a predefined limit value, and the crossflow reduced when the permeate flow lies above a predefined limit value. This too contributes to the minimisation of the energy consumption in the filter system, since the energy for producing the cross flow can be minimized. Whilst the permeate flow can be influenced during the change of the crossflow at constant pressure conditions, it is also possible to influence contamination rates or fouling rates by way of changing the crossflow, and thus to influence the energy consumption of the system over time. By way of changing the energy consumption, the gradient of the curve of the energy consumption and thus its minimum, at which point in time a physical cleaning and/or a cleaning-in-place is carried out can be influenced.

The filtration cycles become longer and therefore more permeate is produced with a greater crossflow, but at a higher energy consumption due to the higher crossflow. This means that with a greater crossflow, the physical cleaning or a backwashing is necessary later than with a lesser crossflow. I.e. a minimum of the relative energy consumption as described before will be reached later on, so that the production period is extended. The simulation of the relative energy consumption curve over time for a few different crossflow settings permits that crossflow setting, i.e. that crossflow to be selected, which permits the most energy-efficient operation, i.e. with the lowest minimum of the curve for the relative energy consumption. The same concept not only can be used for the evaluation of the point in time for a backwashing, but also whist taking the global relative energy consumption into account, as is described below by way of FIGS. 9-11. I.e. here the curve for the global relative energy consumption for the complete cleaning-in-place cycle can be simulated for different crossflow settings, in order to find the optimal crossflow setting which permits the lowest minimum of the global relative energy consumption.

According to a further preferred embodiment, it is possible to simulate a curve for the relative energy consumption over time for different crossflows, i.e. differently great crossflows. Then that value for the crossflow, at which the curve for the minimal energy consumption has its lowest minimum, can be selected. This can be effected for the local relative energy consumption between two physical cleanings as well as for the global relative energy consumption between two cleaning-in-place procedures.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
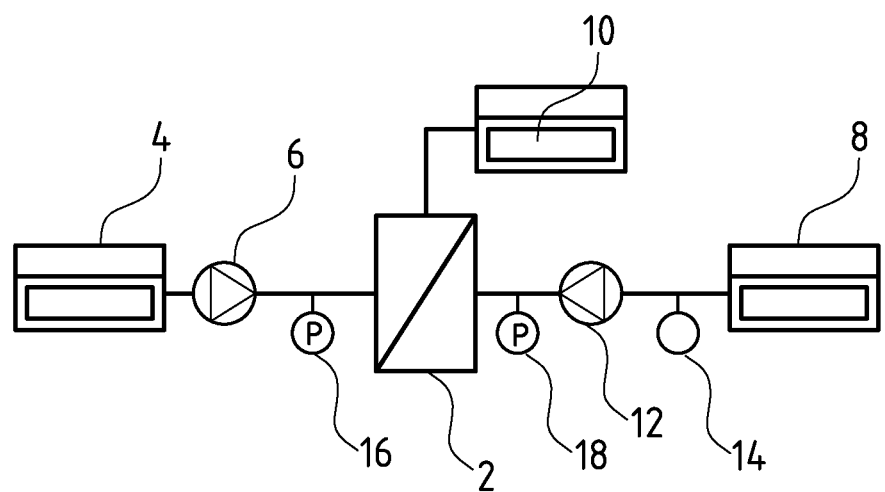
FIG. 1a is a schematic view of a first example of a filter system.

Referring to the drawings, a first filter system, in which the control method according to the invention can be applied, is shown schematically in FIG. 1a. The filter system as a central element comprises a filter element 2. This for example can be a membrane or an arrangement of several membranes. However, another suitable filter element or other suitable filter elements can be applied. Medium to be filtered, for example contaminated water is fed to the filter element 2 from a feed 4, for example from a well, via a feed pump 6. The filtered medium or water at the exit side of the filter element 2 flows into a collection container 8. The arising concentrate 10 which does not pass the filter element 2, is collected or led away in another suitable manner. Moreover, a backwashing pump 12, via which filtered medium, i.e. permeate can be pumped out of the collection container 8 back to the filter element 2 and through this opposite to the filtration direction, in order to backflush the filter element 2, is arranged on the exit side of the filter element 2 in the flow path to the collection container 8. The medium which thereby exits at the entry side of the filter element 2 is discharged with the concentrate 10. Moreover, a flow sensor 14 is arranged in the arrangement in the flow path from the filter element 2 to the collection container 8 and detects the permeate flow rate, or in the opposite direction the backflush flow rate. Moreover, a first pressure sensor 16 is arranged at the entry side of the filter element 2 and a second pressure sensor 18 at the exit side of the filter element, via which sensors the differential pressure P across the filter element 2, i.e. the transfilter or transmembrane pressure TMP can be determined.

Figure 1B:
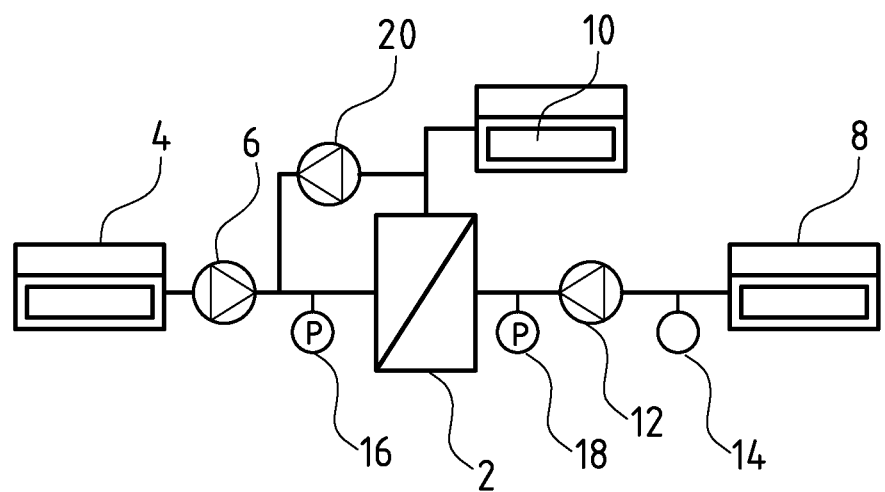
FIG. 1b is a schematic view of a second example of a filter system amid the use of a crossflow.

With the design according to FIG. 1b, it is the case of a filter system with a crossflow. A crossflow pump 20 is arranged in this filter system additionally to the design described by way of FIG. 1a, and this crossflow pump circulates the medium to be filtered, via the entry side of the filter element 2, i.e. a crossflow over the filter element is produced, which has the effect that the filter element becomes contaminated more slowly.

Figure 2:
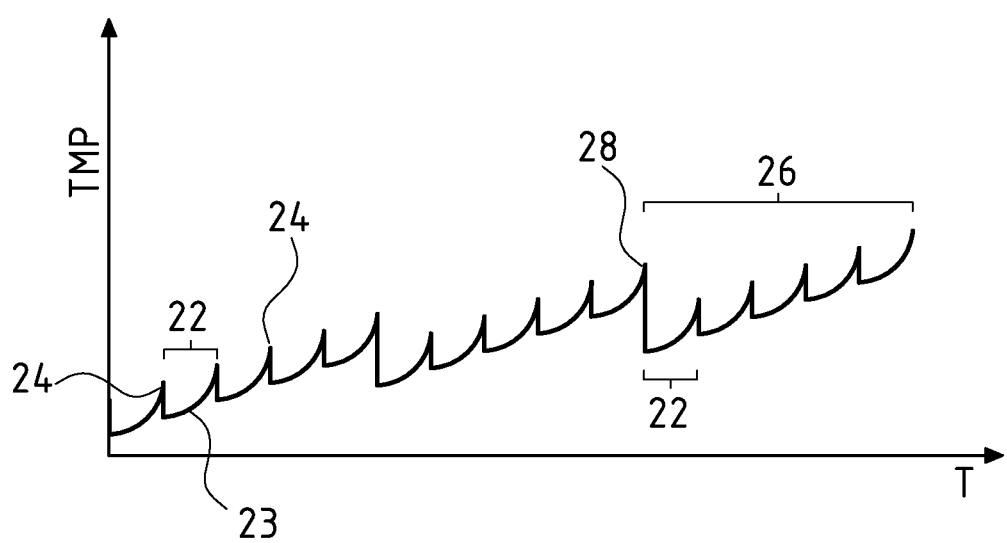
FIG. 2 is a diagram which shows the differential pressure across the filter system plotted over time.

FIG. 2 schematically shows the operation of the filter element 2, wherein the pressure or the pressure difference TMP across the filter element 2 is plotted against time T. It can be recognized that many filtration cycles 22 follow one another, wherein each filtration cycle 22 initially consists of a physical cleaning 24 and a subsequent production phase or a subsequent production cycle 23, in which the actual filtration procedure is carried out. Again a physical cleaning 24 is effected subsequently to the production cycle 23, whereupon the next filtration cycle 22 begins. It can be recognized that the differential pressure TMP across the filter element 2 increases during the production cycle 23 and can be reduced again with the physical cleaning 24 which in particular is a backwashing with the help of the backwashing pump 12 described above, wherein however the initial condition cannot be recreated again. A cleaning-in-place 28 amid the use of cleaning agents or chemicals is effected after a certain number of such filtration cycles 22, by which means the differential pressure across the filter element 2 can be reduced by a greater amount. Subsequently, again several filtration cycles 22 are effected until a renewed cleaning-in-place 28 is necessary. A cleaning-in-place cycle 26 thus includes a cleaning-in-place 28 and a subsequent number of filtration cycles 22 up to the beginning of the cleaning-in-place procedure 28.

Whereas in known systems, the operation of the filter system is mainly controlled via the changes of the differential pressure TMP across the filter system or the filter element 2, according to the invention, one envisages designing the control method such that the system is operated in an energy-optimized or cost-optimized manner. For this, firstly one envisages controlling the filter system such that a desired net permeate flow $Q_N$ is produced. I.e. the produced permeate quantity minus the permeate quantity which is necessary for the cleaning or backwashing is considered and is held at a desired setpoint. By way of this, one prevents too much permeate being produced, which would lead to unnecessary energy costs and cleaning costs.

Moreover, according to the invention one envisages detecting the total energy consumption $E_G$ of the filter system and thus the total costs, in a continuous manner during the filtration cycle 22. The total energy consumption $E_G$ as a rule is the electrical energy consumption of the complete system which first and foremost is determined by the energy consumption of the pumps 6 and 12 or, as the case may be, of the crossflow pump 20. The total energy consumption $E_P$ is summed from the energy consumption $E_P$ for the production cycle as well as the energy consumption $E_B$ for the backwashing procedure. Thereby, it is always a filtration cycle 22 beginning with the backwashing procedure which represents a physical cleaning 24 which is considered. The relative energy consumption $E_{rel}$ is determined from this total energy consumption $E_G$, by way of the total energy consumption $E_G$ being related to the produced net permeate volume $Q_N$. Thereby, the net permeate volume $Q_N$ is the produced permeate volume $Q_P$ minus the backwashing volume $Q_B$ which is required for the backwashing procedure.

Figure 3:
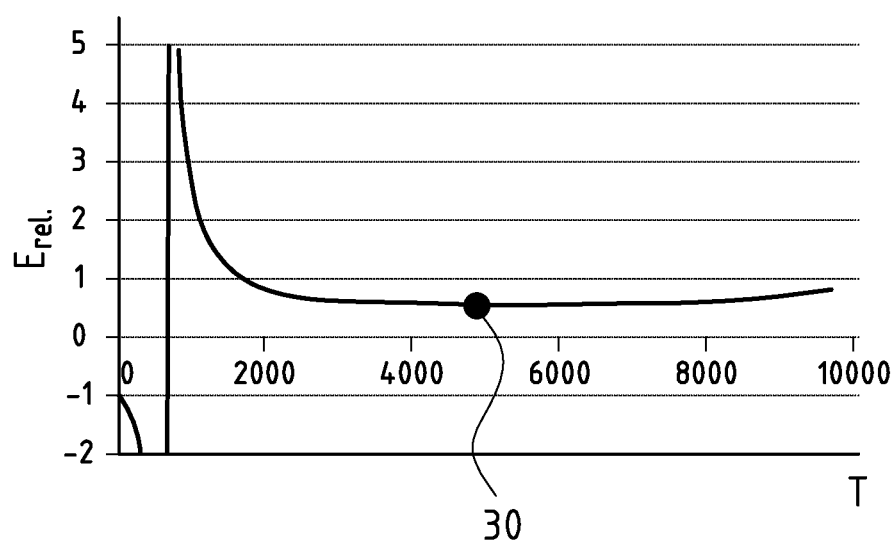
FIG. 3 is a diagram of the relative energy consumption of a filtration cycle plotted over time.
Figure 4:
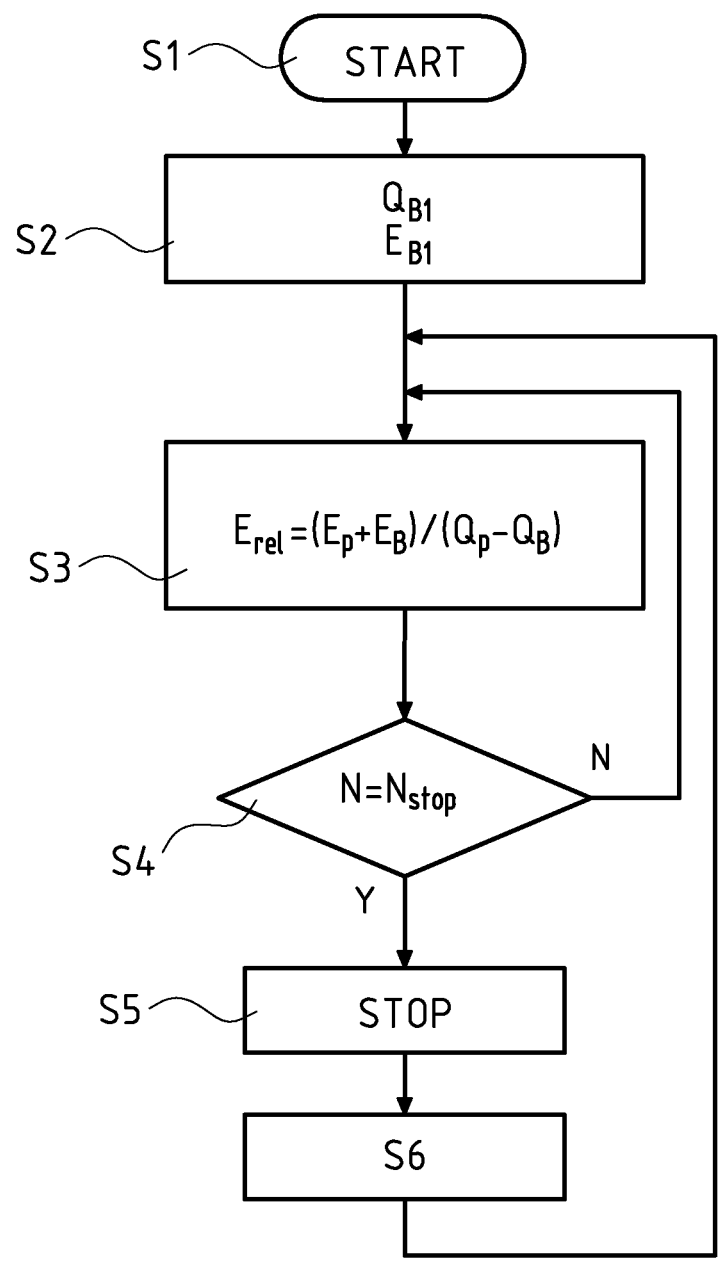
FIG. 4 is a flow diagram which shows the evaluation of the duration of a filtration cycle.

The filtration thereby takes its course as is represented in FIG. 4. Beginning with step S1, firstly an estimated backwashing volume $Q_{B1}$ and an estimated backwashing energy consumption $E_{B1}$ is ascertained in step S2, firstly for the first filtration cycle 22 at the beginning of which no physical cleaning 24 takes place. Then on the basis of these values, the production energy consumption $E_P$ is detected and summed in a continuous manner during the production cycle 23, in step S3. The produced permeate volume $Q_P$ is simultaneously continuously detected and summed. Thus the current relative energy consumption $E_{rel}$ is continuously determined on the basis of the previously ascertained values for the backwashing energy consumption $E_B$ (for the first cycle $E_{B1}$) and the backwashing volume $Q_B$ (for the first cycle $Q_{B1}$). FIG. 3 shows the curve of the relative energy consumption $E_{rel}$, plotted against time T. One can recognize that this firstly at the beginning is negative and then tends to infinity, since no produced permeate volume $Q_P$, but only consumed backwashing volume $Q_B$ is present at the beginning. As soon as so much permeate volume $Q_P$ has been produced, that the consumed backwashing volume $Q_B$ is filled up again, the relative energy consumption $E_{rel}$ decreases over time, until it reaches a minimum 30. The gradient of the curve is equal to zero at the minimum 30.

The gradient N, i.e. the derivative of the relative energy consumption $E_{rel}$ is continuously monitored, and examined as to whether the gradient has reached a limit gradient $N_{STOP}$, during the production cycle 23, via step S4. The production cycle 23 is continued as long the limit gradient $N_{STOP}$ has not been reached. If the limit gradient $N_{STOP}$ is reached, the production cycle 23 is stopped in step S5 and a physical cleaning 24, i.e. a backwashing is carried out. In the step S6, the energy consumption $E_B$ required for the physical cleaning 24 and the required backwashing volume $Q_B$ is detected and then in step S3 forms the basis with the computation of the relative energy consumption $E_{rel}$ for the next filtration cycle 22. In the example according to FIG. 3, the production cycle 23 is stopped on reaching a limit gradient $N_{STOP}$=0, i.e. on reaching the minimum 30. By way of this, one succeeds in the production cycle 23 being completed such that the intervals between the physical cleanings 24 are selected such that a production in the production cycle 22 can be carried out at the minimal energy consumption or cost expense whilst taking into account the necessary physical cleaning 24. However, what is not taken into account thereby is the fact that a cleaning-in-place (CIP) 28 is necessary in certain intervals. This likewise requires energy and causes costs. Inasmuch as this is concerned, it can be desirable to tolerate a higher energy consumption in the individual filtration cycles 22 if the CIP cycle 26 can be extended by way of this and thus the number of necessary cleaning-in-place procedures 28 can be reduced. This is effected in a manner such that the limit gradient $N_{STOP}$ is adapted whilst taking into account the energy consumption or the costs for a CIP cycle 28, i.e. is displaced by a certain amount with respect to the minimum 30.

Figure 6:
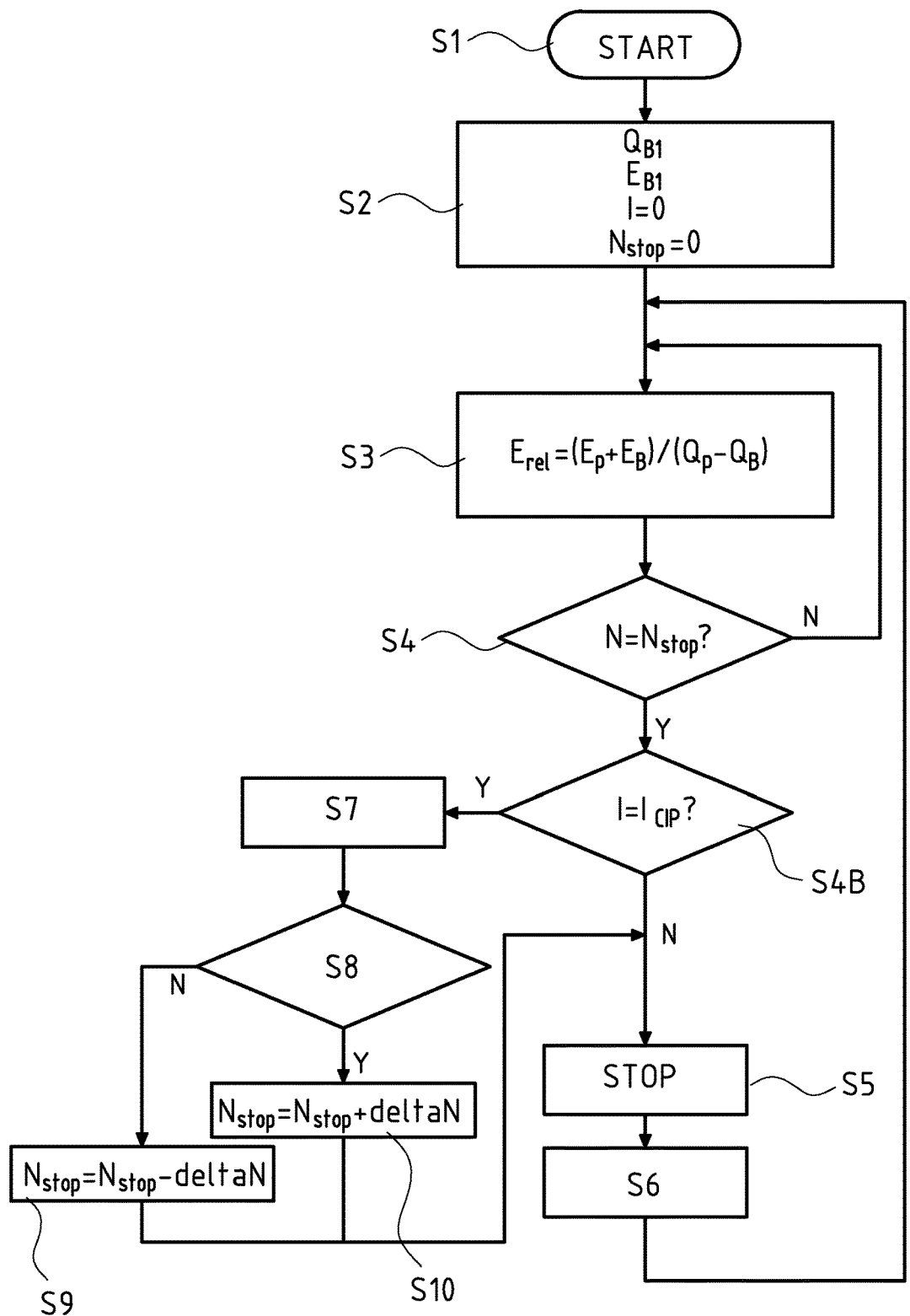
FIG. 6 is a flow diagram which shows the adaptation of a limit gradient for the relative energy consumption.

FIG. 6 shows the respective method course or procedure. The filtration is started in step S1, wherein then firstly an estimated energy consumption $E_{B1}$ for the first physical cleaning and an estimated backwashing volume $Q_{B1}$ for the first physical cleaning are ascertained in step S2 for the first cycle, as described above. Moreover, the counter I for the number of filtration cycles 22 is set to 0 and the limit gradient $N_{STOP}$ is firstly set to 0. The continuous detection or summing of the relative energy consumption $E_{rel}$ is effected then in step S3, wherein the backwashing volume $Q_{B1}$ and the backwashing consumption $E_{B1}$ are taken as a basis for the first filtration cycle 22. Then in each case the backwashing volume $Q_B$ and the backwashing energy consumption $E_B$ of the preceding backwashing procedure or the preceding physical cleaning 24 are taken as a basis for subsequent filtration cycles 22. In step S4, the computation of the gradient N of the curve of the relative energy consumption over time T and the comparison with the limit gradient $N_{STOP}$ are effected in step S4, as is described by way of FIG. 4. The production cycle 23 is continued for as long as this is not reached. The steps S5 and S6 take their course as described by way of FIG. 4. However yet a step S4B is inserted between the steps S4 and S5, in which step the counter I for the number of filtration cycles 22 is compared to a set point or default value $I_{CIP}$. The set point indicates a defined number of cycles (e.g. 10, 20, 30, etc), after which an estimation of the costs or the energy consumption for the complete CIP cycle 26 is begun. As long as this set point $I_{CIP}$ is not reached, the method continues to run with the steps S5 and S6 as explained by way of FIG. 4. If the set point $I_{CIP}$ is reached, then in step S7 the relative total energy consumption for the complete CIP cycle is predicted on the basis of the relative energy consumption $E_{rel}$ summed over several filtration cycles 22. Thereby, the energy consumption or the costs for a preceding cleaning-in-place procedure 28 are taken into account. If a preceding CIP procedure 28 has not yet taken place, then the estimated costs are firstly applied.

Figure 5:
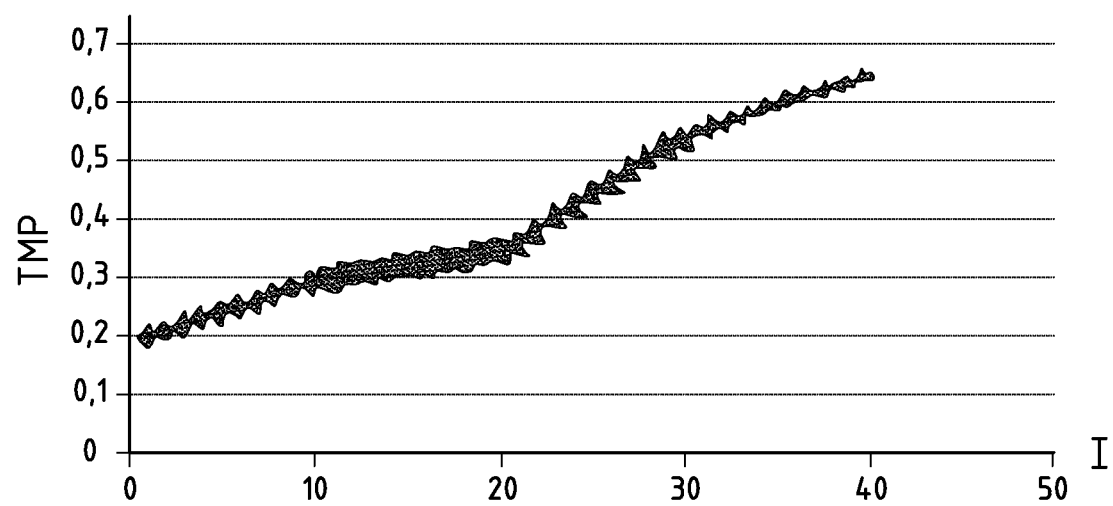
FIG. 5 is a diagram of the differential pressure across the filter system plotted against the number of filtration cycles.

An extrapolation of the curve which is represented in FIG. 5 is carried out, in order to be able to estimate the number of the filtration cycles 22 which are yet to follow until the next CIP 28. In FIG. 5, the differential pressure TMP across the filter element 2 or across the complete filter system is plotted against the number of cycles I. A CIP 28 is started when this differential pressure TMP reaches a predefined limit value. The gradient of the curve over the filtration cycles I is extrapolated up to this limit value, so that the number of filtration cycles yet to be effected until then is estimated. The energy consumption is estimated in a summed manner in step S7 for this. In step S8, it is compared as to whether the thus estimated energy consumption is greater or smaller than the energy consumption which is estimated in the preceding filtration cycle 22. Here, the costs can also be consisted instead of the energy consumption, in which costs for example the costs for the necessary cleaning agents in the cleaning-in-place procedure can also be taken into account. If the currently estimated energy consumption or the currently estimated costs for the complete CIP cycle are smaller than the energy consumption or the costs which were estimated in the preceding filtration cycle 22, the limit gradient $N_{STOP}$ is reduced by a valve $\Delta N$ in step S9. The step S5 described above is then effected subsequently to this. Step S10 then follows if the estimated energy consumption or the estimated costs are not smaller than the energy consumption estimated in the preceding filtration cycle 22 or the costs estimated there, and the limit gradient $N_{STOP}$ is increased by the predefined valve $\Delta N$. Thus an adaptation of the limit gradient $N_{STOP}$ is effected and, as the case may be, a shift of the point at which a physical cleaning 24 is started, with respect to the minimum 30 shown in FIG. 3. Thus the point on the curve shown in FIG. 3 can be displaced to the left or to the right. Thus the length of the filtration cycles 22 is optimized in a manner such that as a whole the energy consumption or the costs for the complete CIP cycle 26 can be minimized.

Figure 7:
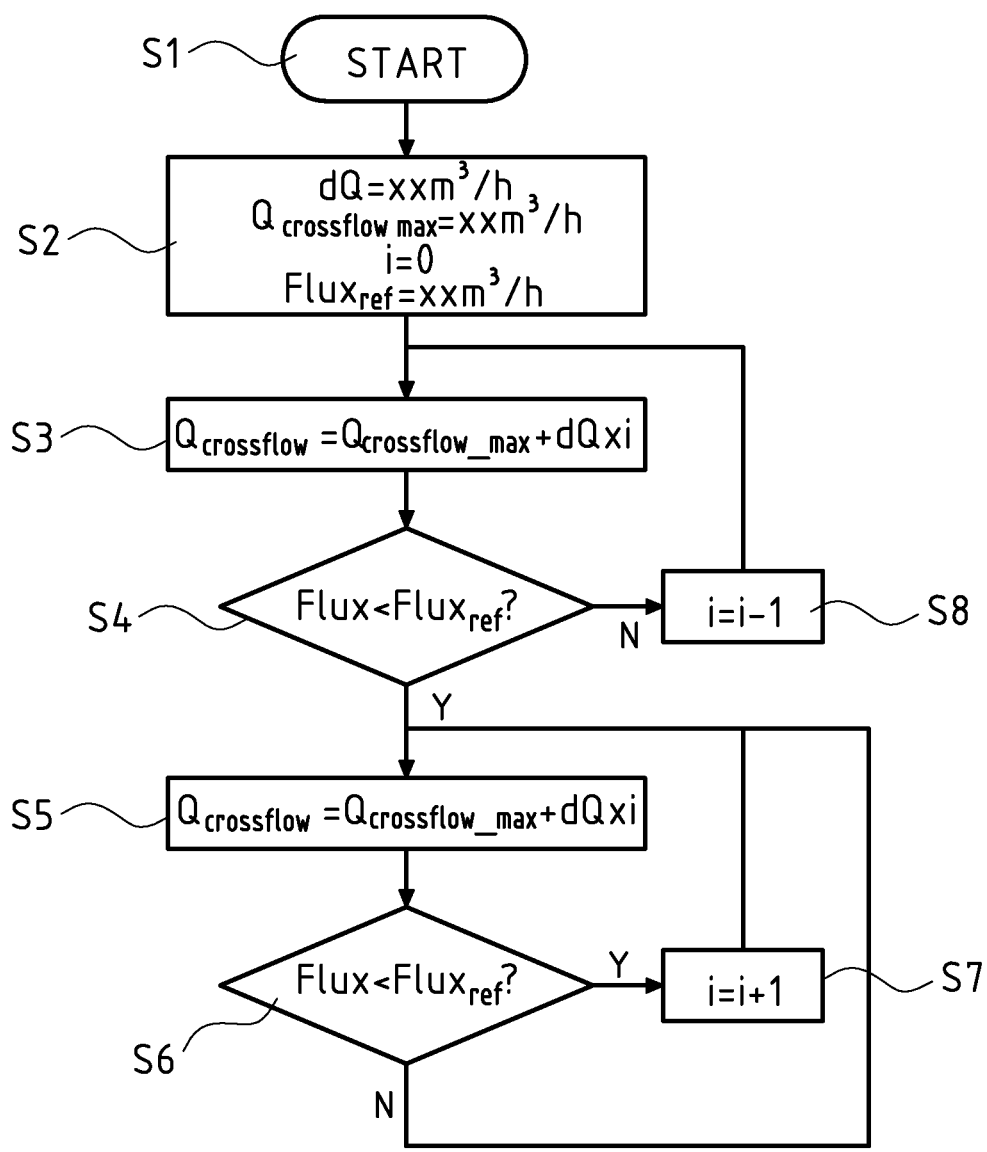
FIG. 7 is a flow diagram which shows the adaptation of a crossflow.

If the filtration during a filtration cycle is carried out with a crossflow, then according to a particular embodiment of the invention, one envisages likewise optimizing this crossflow. This according to a first method variant can be effected as is shown in FIG. 7. After the start of the control process in step S1, firstly predefined initial values are set in step S2. Thus a change value dQ for the crossflow is set as a predefined value. Moreover, a setpoint for the crossflow $Q_{crossflowmax}$ is set. A counter I is set to zero and moreover a flow $Flux_{ref}$ is set as a desired flow for the produced permeate. In the next step S3, the set crossflow $Q_{crossflow}$ is firstly set to the setpoint $Q_{crossflowmax}$ which is set in step S2. Since the counter I is equal to zero, no increase or reduction of the value is effected at this point in time. In step S4 in FIG. 7, one then examines as to whether the current permeate flow Flux is smaller than the desired flow $Flux_{ref}$. If this is the case, firstly step S5 follows, in which no change of the crossflow $Q_{crossflow}$ takes place since the counter I continues to be zero. An examination as to whether the permeate flow Flux is smaller than the previously set desired flow $Flux_{ref}$ is effected afresh in step S6. If this continues to be the case, an increase of the counter I by the value one is effected in step S7 and subsequently an increase in the crossflow $Q_{crossflowmax}$ by the value $i \cdot dQ$ is thus effected in step S5. Step S6 is effected anew subsequently to this. If the inquiry in step S6 results that the permeate flow is the same or greater than the desired flow $Flux_{ref}$, then no further increase of the counter i is effected and the crossflow $Q_{crossflow}$ remains constant. If the inquiry in step S4 results that the permeate flow Flux is the same or greater than the desired flow $Flux_{ref}$, then step S8 follows, in which the counter i is reduced by the value one. Following step S8 is then step S3 again, in which then, with a counter i different to zero, the crossflow $Q_{crossflowmax}$ is reduced by the change value dQ multiplied by the counter i, since the counter i is then negative. This is effected for so long until the desired permeate flow has been reached. A desired permeate flow $Flux_{ref}$ can be achieved with a minimal crossflow in this manner.

A further alternative for optimizing the crossflow is to plot the curve of the local relative energy consumption for the running production cycle over time, as has been described previously. Thus different relative energy consumptions for different crossflows can be simulated in a simulation process, and then one can select that crossflow, at which the simulated curve for the relative energy consumption reaches the lowest minimum. The energy consumption for producing the crossflow is also taken into account in the relative energy consumption via the total energy consumption.

Figure 8:
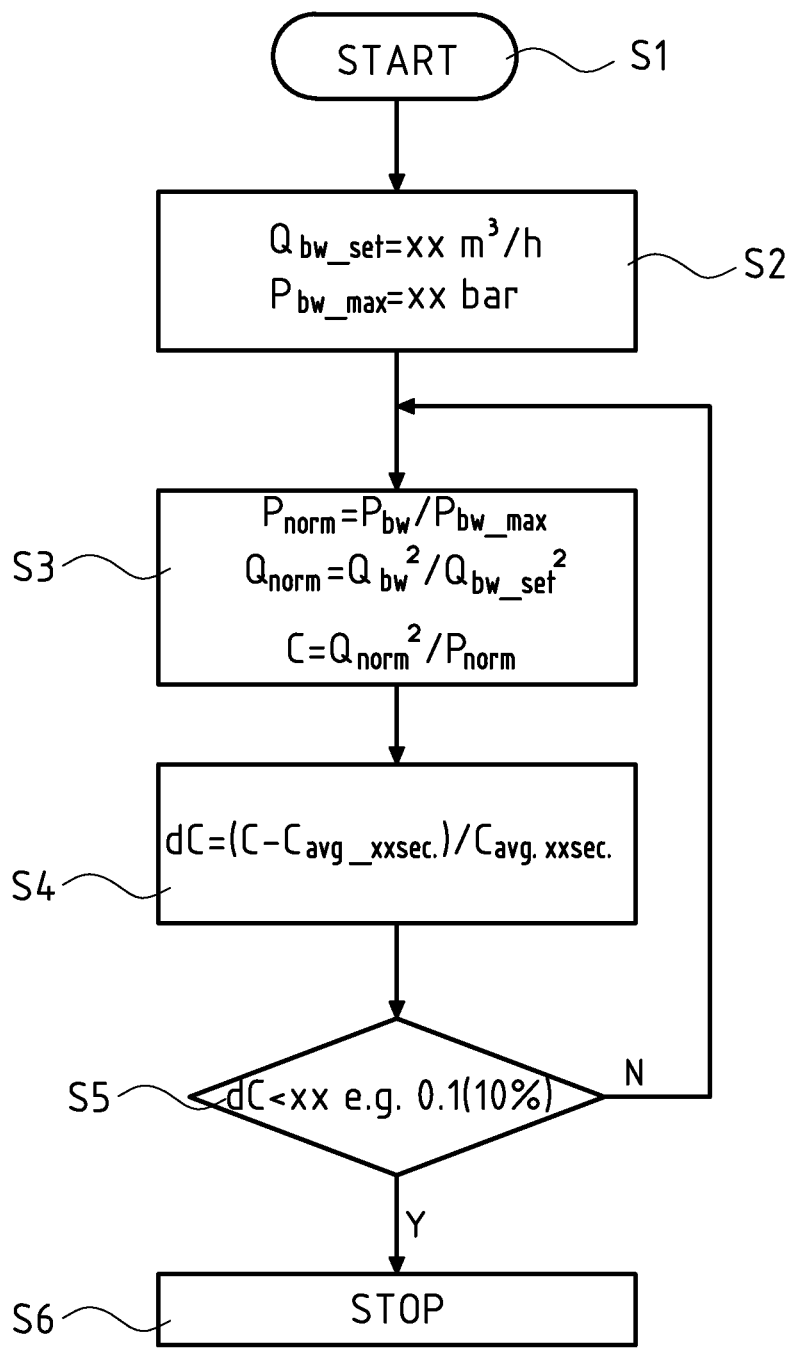
FIG. 8 is a flow diagram which represents the evaluation of the length of a cleaning procedure.

Finally, according to the invention it is also preferable to optimize the individual backwashing procedures or physical cleaning procedures 24 with regard to their duration. For this, one envisages continuously monitoring a system parameter during the backwashing procedure and completing the backwashing procedure 24 when this system parameter is essentially constant or stable. Thereby, a value which represents the hydraulic resistance of the system is considered as a system parameter. I.e. the physical cleaning 24 is carried out until this hydraulic resistance assumes a stable value or approximates a stable value. This method is schematically represented in FIG. 8. The backwashing procedure or the physical cleaning 24 begins in step S1. A setpoint $Q_{bw\_set}$ and a maximal value $P_{bw\_max}$ for the pressure during the backwashing procedure are set in step S2. The flow rate thereby corresponds to the flow rate at the flow sensor 14, through the filter element 2 in the flushing direction. The pressure $P_{bw}$ corresponds to the pressure between the pressure sensors 16 and 18 during the physical cleaning, i.e. the transmembrane pressure TMP.

During the physical cleaning, the actual pressure $P_{bw}$ as well as the actual flow rate $Q_{bw}$ is continuously detected in step S3. Thereby continuously normalized values $P_{norm}$ and $Q_{norm}$ are determined by way of division of the detected pressure $P_{bw}$ by the maximal pressure $P_{bwmax}$ as well as by way of the division of the square of the detected flow rate $Q_{bw}$ by the square of the setpoint for the flow rate $Q_{bw\_set}$. A characteristic value C for the hydraulic resistance $C=Q_{norm}^2/P_{norm}$ is continuously formed therefrom. The change dC of this characteristic value C according to the formula shown in FIG. 8 in step S4 is determined in step S4, by way of the difference of the characteristic value C and the running average $C_{avg}$ and this difference being relates to the running average $C_{avg}$. The physical cleaning 24 is continued as long as this deviation dC is greater than a predefined value. If the deviation dC reaches or falls short of the limit value, this is an indication that the characteristic value C which represents the hydraulic resistance of the system is stable. The cleaning procedure 24 is stopped in this case in step S6.

Figure 9:
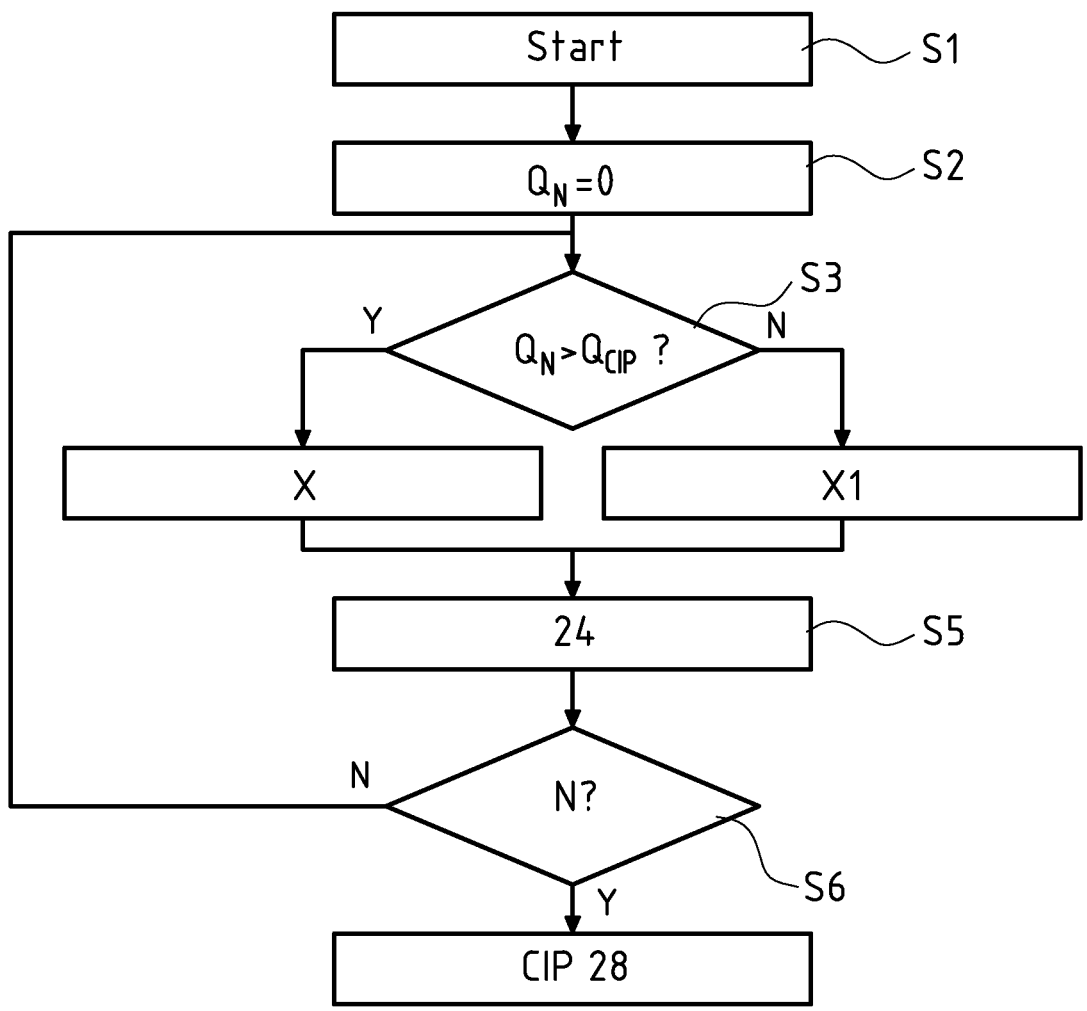
FIG. 9 is a flow diagram for an alternative method for determining the points in time for a physical cleaning and a cleaning-in-place.
Figure 10:
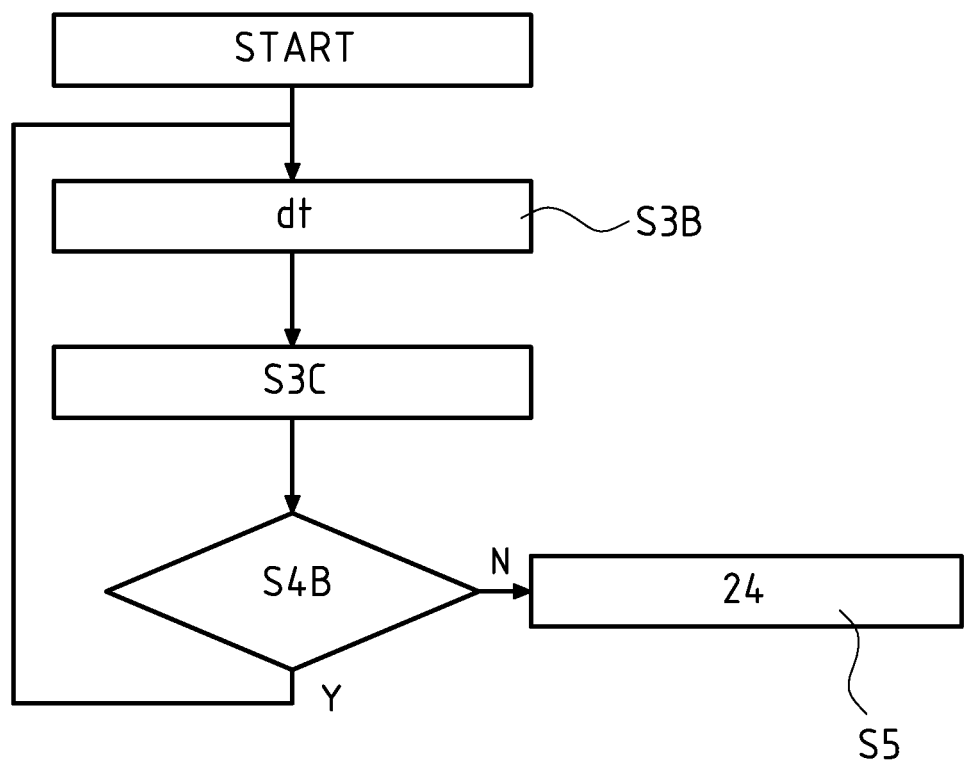
FIG. 10 is a detail flow diagram of the procedure in step X in FIG. 9.
Figure 11:
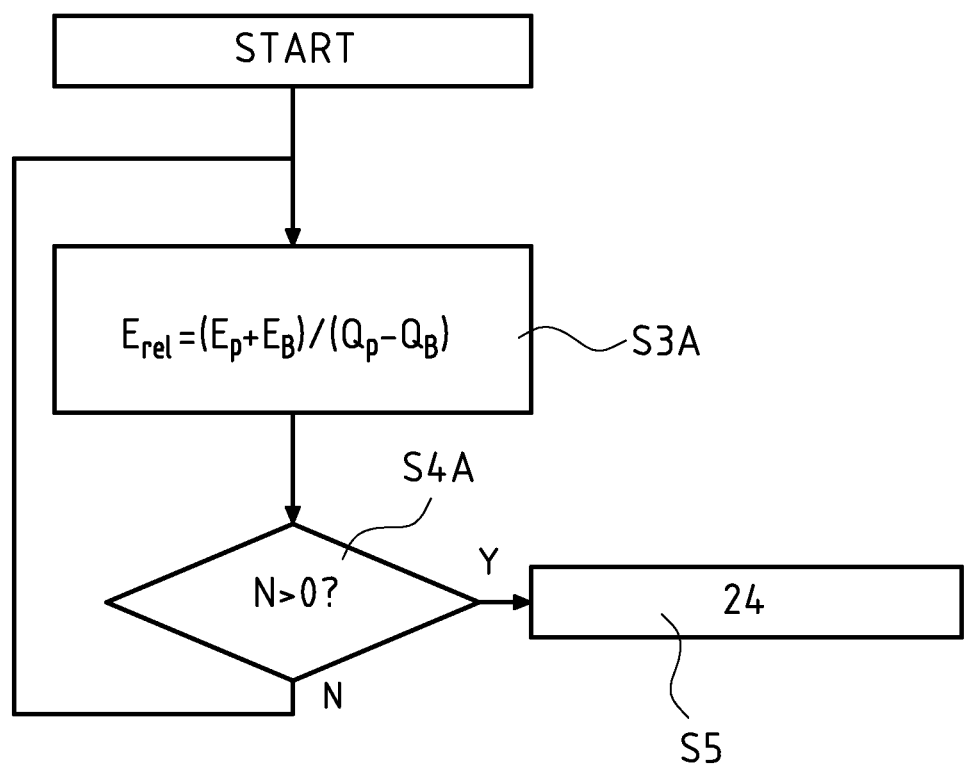
FIG. 11 is a detail flow diagram of the procedure in step XI in FIG. 9.
Figure 12:
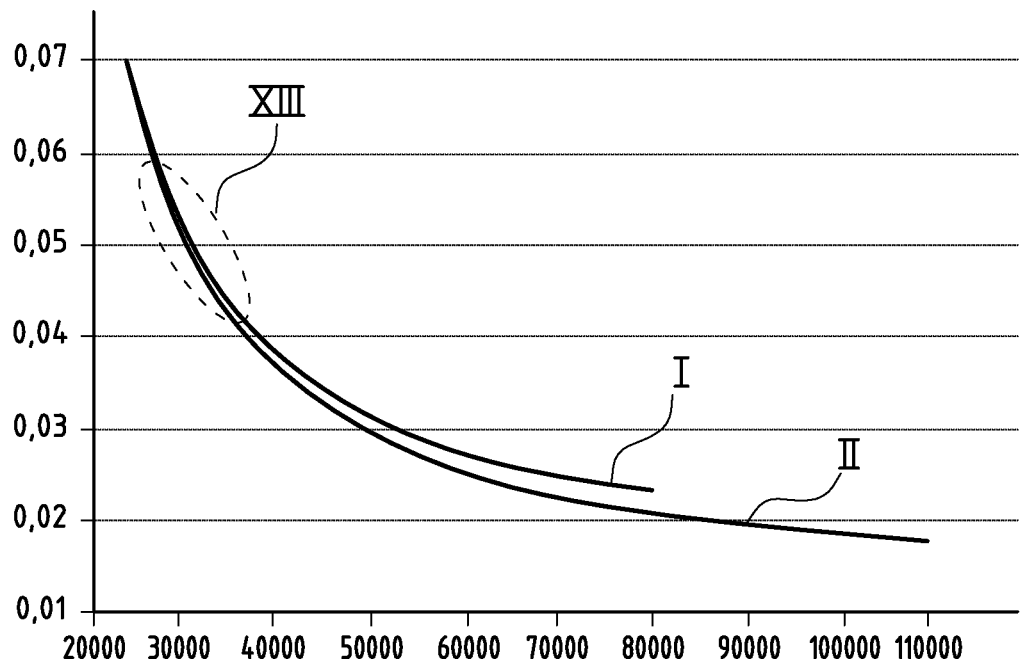
FIG. 12 is a diagram of two possible curves for the global relative energy consumption.
Figure 13:
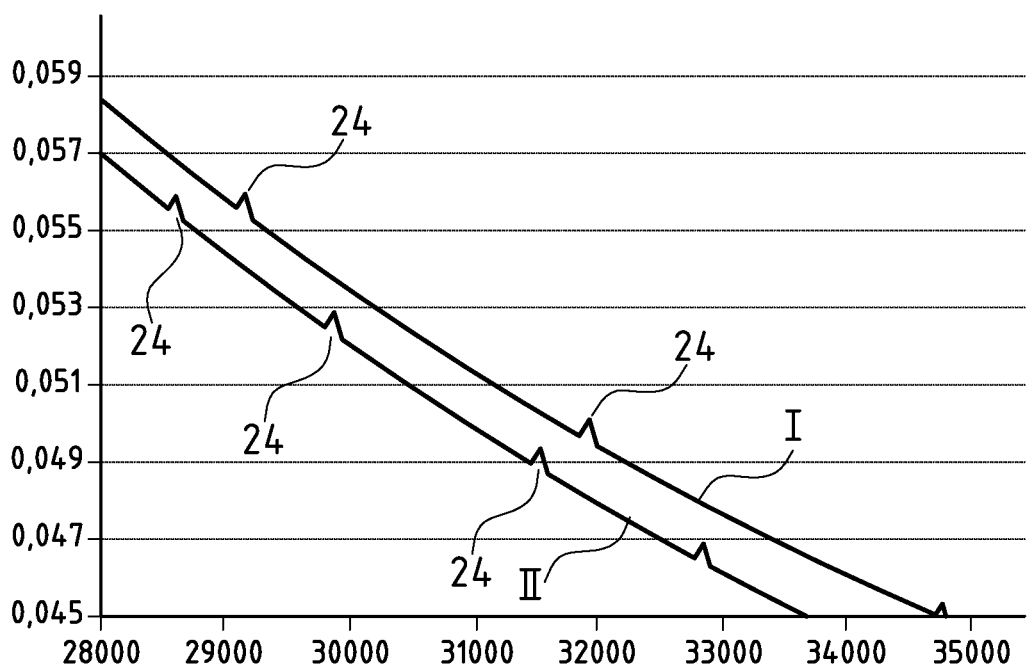
FIG. 13 is a diagram of the detail XIII from the curves in FIG. 12.

An alternative method procedure for determining the point in time for a physical cleaning 24 or a CIP procedure which is to say a cleaning-in-place 28 is described by way of FIGS. 9-11. Thus both alone can be effected on the basis of the consideration of the global relative energy consumption $E_{rel}$ or of the curve of the global relative energy consumption $E_{rel}$ between two CIP procedures. FIG. 12 shows two possible curves of the global relative energy consumption plotted over time. FIG. 13 shows enlarged detail XIII of the curves shown in FIG. 12. The curve of the global relative energy consumption corresponds essentially to the curve for the local relative energy consumption which shown in FIG. 3, but is only plotted over a correspondingly longer time period over several physical cleanings. Furthermore, the curve, for the global relative energy consumption, do not run smooth but as shown in FIG. 12 and FIG. 13 shows deflections or peaks, which indicate the physical cleaning, which leads to a temporary increase of the relative energy consumption. After an effected CIP procedure 28, the method is started in step S1 in FIG. 9. At the beginning, the net permeate volume is firstly $Q_N=0$. Simultaneously, the total energy consumption $E_G$ up to this point in time corresponds to the energy consumption for the preceding CIP procedure. In step S3, one firstly examines as to whether the produced net permeate volume $Q_N$ is greater than the CIP volume $Q_{CIP}$, which means to say the permeate volume which was consumed in the preceding CIP procedure 28. As long as the net permeate volume $Q_N$ is smaller than the previously consumed CIP volume $Q_{CIP}$, the evaluation of the point in time for a physical cleaning 24 is effected either as described previously by way of FIG. 4 or represented schematically in FIG. 11. The method which is shown in FIG. 11 corresponds to step S3A or the step S3 in FIG. 4. There, the local relative energy consumption, i.e. for the running production cycle is continuously detected. In step S4A, in contrast to FIG. 4, one does not examine as to whether a limit gradient $N_{STOP}$ has been reached, but whether the gradient $N_N$ is greater than zero. This mean that here $N_{stop}=0$. If the gradient 0 has been reached, then a physical cleaning 24 is carried out in step S5, (also step S5 in FIG. 9). The filtration cycle 22 is continued as long as the limit gradient $N_{STOP}=0$ has not been reached.

In FIG. 9, subsequent to an effected physical cleaning 24 in step S5 is step S6, in which it is examined as to whether the gradient N of the global relative energy consumption has changed its sign (polarity). With the global relative energy consumption $E_{rel}$ forming the basis here, the total energy consumption since the last CIP procedure 28 including the energy consumption for this CIP procedure 28 and the subsequent physical cleanings as well as the subsequent production cycles forms the basis. Here too, the total net permeate volume QN for this time period since the last CIP procedure 28 forms the basis. In contrast to this, only the local relative energy consumption $E_{rel}$ for the individual production cycle 23 between two physical cleanings 24 forms the basis of step XI which is described by way of FIG. 4 and FIG. 11.

Step S3 follows again, as long as the gradient N of the global curve, which is shown in FIG. 12 and FIG. 13 since the last CIP procedure in step S6 has not changed its sign. If there is a change of the sign which means the minimum has been passed or exceeded, then a CIP procedure 28 follows in the next step. The method is started anew in step S1. This minimum corresponds to the minimum 30 in FIG. 3.

In step S3 in FIG. 9, one differentiated as to whether the net permeate volume $Q_N$ has exceeded the CIP volume $Q_{CIP}$, which means that more permeate was produced, than in the preceding CIP procedure. The point in time for a physical cleaning 24, as has been described previously, is determined for as long as this is not the case. As soon as more volume has been produced, step X which is described in FIG. 10, follows step S3. Then the point in time of the physical cleaning 24 can likewise be determined by way of the global curve for the relative energy consumption $E_{rel}$ since the last CIP cycle, which means to say over several production cycles 23.

This is effected as described in FIG. 10. After the start of the method procedure, a delay dt of a few seconds is waited in step S3B, subsequently to the step S3 in FIG. 9. On the basis of the current curve of the relative energy consumption, $E_{rel}$ over time the current gradient of this curve at the current point in time is determined subsequently in step S3C. In step S4B it is then compared as to whether the currently determined gradient is more favorable than the gradient in a preceding computation step, which means before the delay dt. If the gradient is more favorable, then step S3B follows anew. The gradient is more favorable if it is steeper, wherein the gradient is negative since the curve drops monotonously in this region. If the curve course becomes shallower, which means the magnitude of the gradient becomes smaller, the gradient course is less optimal and a physical cleaning 24 in step S5 which corresponds to step S5 in FIG. 9, is subsequent to step S4B. Again step S6 in FIG. 9 is subsequent to this. This means that with this method variant, the point in time for the physical cleaning 24 is determined by way of the global curve for the relative energy consumption over the complete CIP cycle 26. The physical cleaning 24 is started when the gradient or its magnitude becomes smaller, which means the curve becomes shallower, which is to say the reduction of the relative energy consumption slows down. The FIGS. 12 and 13 show two curves I and II for the global relative energy consumption, wherein in the curve II the cycle time between two physical cleanings 24 is shortened compared to curve I, this means the curve decreases steeper is insofar more favorable, since the global relative energy consumption is lower.

While specific embodiments of the invention have been shown and described in detail to illustrate the application of the principles of the invention, it will be understood that the invention may be embodied otherwise without departing from such principles.

The invention claimed is:

1. A control method for controlling a filter system, which filter system comprises at least one filter element, the method comprising the steps of:
   continuously recording a total energy consumption during a filtration cycle of the filter system to provide a cumulative filtration cycle total energy consumption, wherein the cumulative filtration cycle total energy consumption is comprised of energy consumption for a physical cleaning and energy consumption for a subsequent production cycle up to at predefined point in time;
   computing a relative energy consumption by way of division of the recorded cumulative filtration cycle total energy consumption by a net permeate volume which has been produced during the filtration cycle up to the predefined point in time; and
   starting a physical cleaning of the filter in dependence on the relative energy consumption, wherein the energy consumption for the physical cleaning of the filter is recorded during the physical cleaning of the filter.

2. A control method according to claim 1, wherein a physical cleaning is started at the current point in time, when the relative energy consumption or the characteristic value derived from the relative energy consumption has reached a predefined value.

3. A control method according to claim 1, wherein the physical cleaning is begun when a magnitude of a derivative of the continuously determined relative energy consumption has reached a predefined gradient or has passed a minimum.

4. A control method according to claim 3, wherein the predefined gradient is adapted in dependence on an estimated energy consumption which has been determined on the basis of the energy consumption of a number of preceding filtration cycles.

5. A control method according to claim 4, wherein for adapting the predefined gradient, an extrapolation of the energy consumption of a number of filtration cycles is computed, in order to predict the energy consumption of a current cleaning-in-place cycle, and that such a predicted energy consumption is compared with a previously predicted energy consumption for the current cleaning-in-place cycle.

6. A control method according to claim 5, wherein the predefined gradient is increased when the previously predicted energy consumption is smaller than the currently predicted energy consumption.

7. A control method according to claim 5, wherein the predefined gradient is reduced when the previously predicted energy consumption is greater than the currently predicted energy consumption.

8. A control method according to claim 1, wherein the net permeate volume corresponds to a produced permeate volume minus a volume which is used for a physical cleaning and/or a cleaning-in-place.

9. A control method according to claim 1, wherein the recording of the total energy consumption and of the net permeate volume is started anew before carrying out a physical cleaning or carrying out a cleaning-in-place.

10. A control method according to claim 9, wherein the physical cleaning is a backwashing, a crossflow, a mechanical scraping and/or an air scouring.

11. A control method according to claim 9, wherein at least one system parameter is continuously monitored during the physical cleaning, and the physical cleaning is carried out until the at least one system parameter remains stable.

12. A control method according to claim 11, wherein the at least one system parameter is a hydraulic resistance of the filter system.

13. A control method according to claim 12, wherein a pressure across the filter element or filter system and a flow through the filter element are detected during the physical cleaning, for detecting the hydraulic resistance.

14. A control method according to claim 1, wherein a cleaning-in-place is started when a pressure across the filter element reaches a predefined maximum.

15. A control method according to claim 14, wherein the point in time for the next cleaning-in-place is determined by way of extrapolation of a curve which defines the pressure across the filter system or a filter element at the end of the filtration cycle, with respect to the number of filtration cycles.

16. A control method according to claim 1, wherein:
the continuously recorded total energy consumption corresponds at least to an energy consumption for a cleaning-in-place, to the energy consumption for the effected physical cleanings after a last cleaning-in-place and to the energy consumption for subsequent production cycles up to a predefined point in time, the relative energy consumption is continuously determined on the basis of this total energy consumption; and
a cleaning-in-place is started when the relative energy consumption has reached or passed a minimum.

17. A control method according to claim 16, wherein the relative energy consumption is continuously computed and is plotted as a curve over time, wherein a physical cleaning is started when a magnitude of a gradient of the curve has reached or passed a curve maximum.

18. A control method according to claim 1, wherein a crossflow in the filter system is set on a basis of a current permeate flow.

19. A control method according to claim 18, wherein the crossflow is increased when the permeate flow is smaller than a predefined limit value, and the crossflow is reduced when the permeate flow lies above a predefined limit value.

20. A control method according to claim 18, wherein the relative energy consumption for a running production cycle is simulated for different possible crossflows and that crossflow, at which the simulated curve for the relative energy consumption reaches the lowest minimum, is selected.

21. A control method according to claim 1, wherein a produced net permeate volume per unit of time is compared to a target volume, wherein a production quantity is reduced on exceeding the target volume and is increased on falling short of the target volume.

* * * * *